(12) United States Patent
Ozawa (10) Patent No.: US 12,360,009 B2
(45) Date of Patent: Jul. 15, 2025

(54) GAS SENSOR

(71) Applicant: DENSO CORPORATION, Kariya (JP)

(72) Inventor: Masato Ozawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 257 days.

(21) Appl. No.: 18/304,667

(22) Filed: Apr. 21, 2023

(65) Prior Publication Data

US 2023/0258533 A1 Aug. 17, 2023

Related U.S. Application Data

(63) Continuation of application No. PCT/JP2021/033669, filed on Sep. 14, 2021.

(30) Foreign Application Priority Data

Oct. 22, 2020 (JP) .................................. 2020-177372

(51) Int. Cl.
*G01M 15/10* (2006.01)
(52) U.S. Cl.
CPC .................................. *G01M 15/102* (2013.01)
(58) Field of Classification Search
CPC .............. G01M 15/102; G01N 27/409; G01N 27/41; G01N 27/416
See application file for complete search history.

(56) References Cited

U.S. PATENT DOCUMENTS

2005/0138989 A1 6/2005 Noda et al.
2017/0356874 A1* 12/2017 Nakamura ........... G01N 27/409

FOREIGN PATENT DOCUMENTS

| JP | 2004198360 A | 7/2004 |
| JP | 2005208036 A | 8/2005 |
| JP | 2010084892 A | 4/2010 |
| JP | 4838274 B2 | 10/2011 |
| JP | 2017089792 A | 5/2017 |

* cited by examiner

*Primary Examiner* — Timothy P Graves
(74) *Attorney, Agent, or Firm* — Nixon & Vanderhye P.C.

(57) ABSTRACT

A gas sensor includes a sensor element detecting a concentration of a specified gas, a housing on an inner periphery side of which the sensor element is disposed, a contact terminal contacting an electrode terminal provided to the sensor element, an insulator holding the contact terminal, a base end side cover fixed to a base end side of the housing and covering the insulator, and a disc spring disposed between the cover and the insulator and pushing the insulator toward a tip end side. The insulator has a base end side projecting portion projecting toward the base end side and has an outer periphery base end face, which faces toward the base end side around the base end side projecting portion. The disc spring has a circular body portion and claw portions that project from an inner peripheral edge of the circular body portion toward the base end side.

5 Claims, 7 Drawing Sheets

GAS SENSOR

CROSS-REFERENCE TO RELATED APPLICATION

The present application is a continuation application of International Application No. PCT/JP2021/033669, filed on Sep. 14, 2021, which claims priority to Japanese Patent Application No. 2020-177372, filed on Oct. 22, 2020, the entire contents of each of which are hereby incorporated herein by reference.

BACKGROUND

Technical Field

The present disclosure relates to a gas sensor.

Related Art

Various gas sensors have been developed which are arranged in an exhaust system or the like of an internal combustion engine to detect a concentration of a specified gas in measured gas such as exhaust gas.

SUMMARY

An aspect of the present disclosure provides a gas sensor, including: a sensor element that detects a concentration of a specified gas in measured gas; a housing on an inner periphery side of which the sensor element is disposed; a contact terminal that contacts an electrode terminal provided to the sensor element; an insulator that holds the contact terminal; a base end side cover that is fixed to a base end side of the housing and covers the insulator; and a disc spring that is disposed between the base end side cover and the insulator and pushes the insulator toward a tip end side. The insulator has a base end side projecting portion projecting toward the base end side and has an outer periphery base end face, which faces toward the base end side, around the base end side projecting portion. The disc spring has a circular body portion and a plurality of claw portions that project from an inner peripheral edge of the circular body portion toward the base end side. The disc spring has a flange portion that projects from the inner peripheral edge of the circular body portion to the inner periphery side, and the flange portion contacts the outer periphery base end face.

DETAILED DESCRIPTION OF THE PREFERRED EMBODIMENTS

Various gas sensors have been developed which are arranged in an exhaust system or the like of an internal combustion engine to detect a concentration of a specified gas in measured gas such as exhaust gas. Some of such gas sensors include an insulator holding a contact terminal contacting an electrode terminal of a sensor element. Japanese Patent No. 4838274 discloses a structure in which an elastic member pushes an insulator in an axial direction to stably hold the insulator.

When a gas sensor is assembled, if an elastic member is displaced from a predetermined position and mounted, a malfunction may occur in the product. Japanese Patent No. 4838274 describes an aspect in which the elastic member can be fixed to the insulator. According to the description, in a state in which an inner periphery of the elastic member having a substantially circular shape is pressed into contact with an outer periphery of part of the insulator, the elastic member is fixed to the insulator.

The elastic member disclosed in Japanese Patent No. 4838274 is hollow, and the cross section orthogonal to the circumferential direction has a substantially C shape.

Hence, when the elastic member is compressed in the plug axial direction, the elastic member is caused to be deformed so as to expand to the inner periphery side and to the outer periphery side in the radial direction. That is, when the insulator to which the elastic member is fixed is assembled to another component part of the gas sensor, the elastic member tends to be deformed so as to expand to the inner periphery side and to the outer periphery side in the radial direction. However, since the inner periphery side of the elastic member contacts the insulator, the elastic member is prevented from being deformed. Hence, it is difficult to apply a load from the elastic member to the insulator in the axial direction as desired.

As described above, according to the configuration disclosed in Japanese Patent No. 4838274, it is difficult to fix the elastic member to the insulator before assembly while the load to the insulator is easily adjusted after the assembly. That is, according to the above configuration, it is difficult to make ease of adjusting the load to the insulator and ease of assembling the gas sensor compatible with each other.

The present disclosure provides a gas sensor by which ease of adjusting a load to an insulator and ease of assembling the gas sensor can be compatible with each other.

First Embodiment

An embodiment of a gas sensor will be described with reference to FIG. 1 to FIG. 13.

Figure 1:
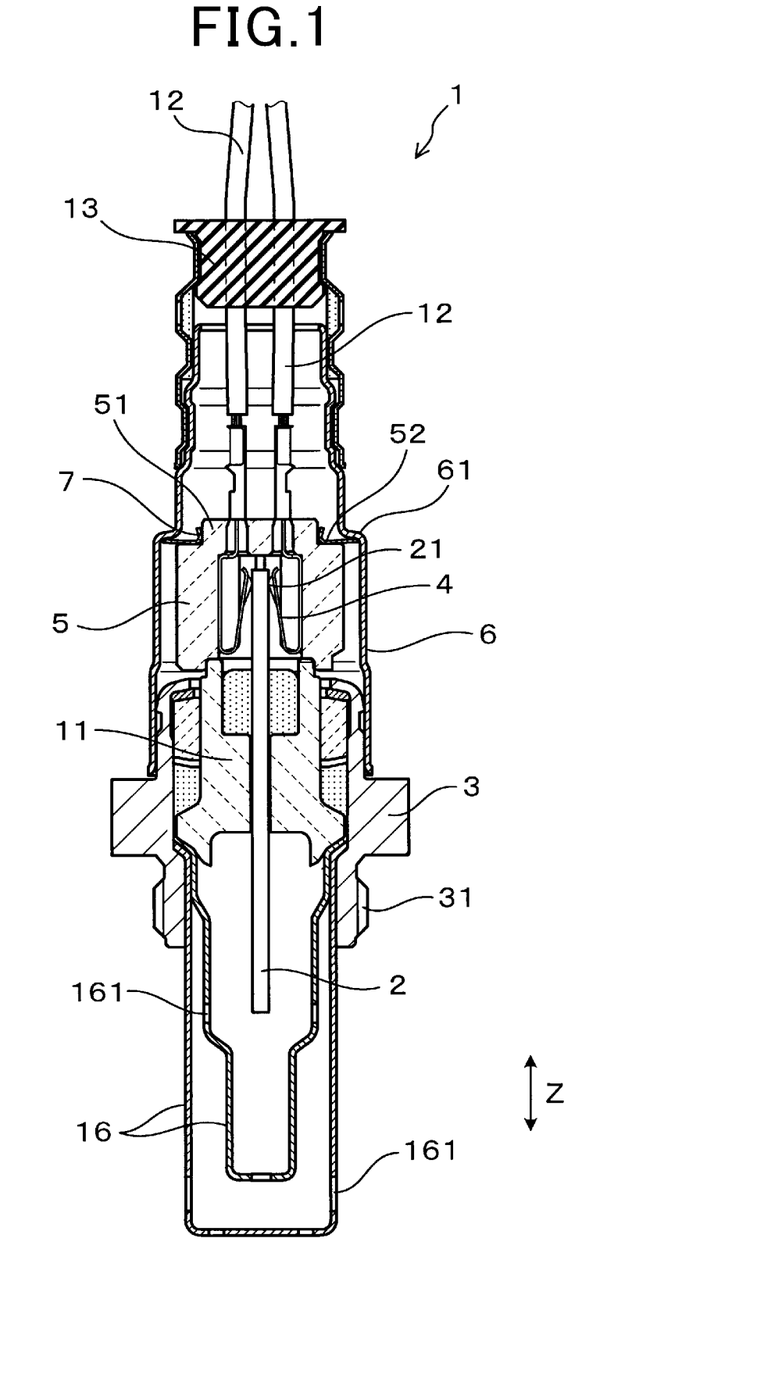
FIG. 1 is a cross-sectional view along an axial direction of a gas sensor according to a first embodiment.

As illustrated in FIG. 1, a gas sensor 1 of the present embodiment has a sensor element 2, a housing 3, contact terminals 4, an insulator 5, a base end side cover 6, and a disc spring 7.

The sensor element 2 detects a concentration of a specified gas in measured gas. The sensor element 2 is disposed on the inner periphery side of the housing 3. The contact terminal 4 contacts an electrode terminal 21 provided to a base end portion of the sensor element 2. The insulator 5 holds the contact terminal 4. The base end side cover 6 is fixed to a base end side of the housing 3 and covers the insulator 5. The disc spring 7 is disposed between the base end side cover 6 and the insulator 5 and pushes the insulator 5 toward a tip end side.

Figure 2:
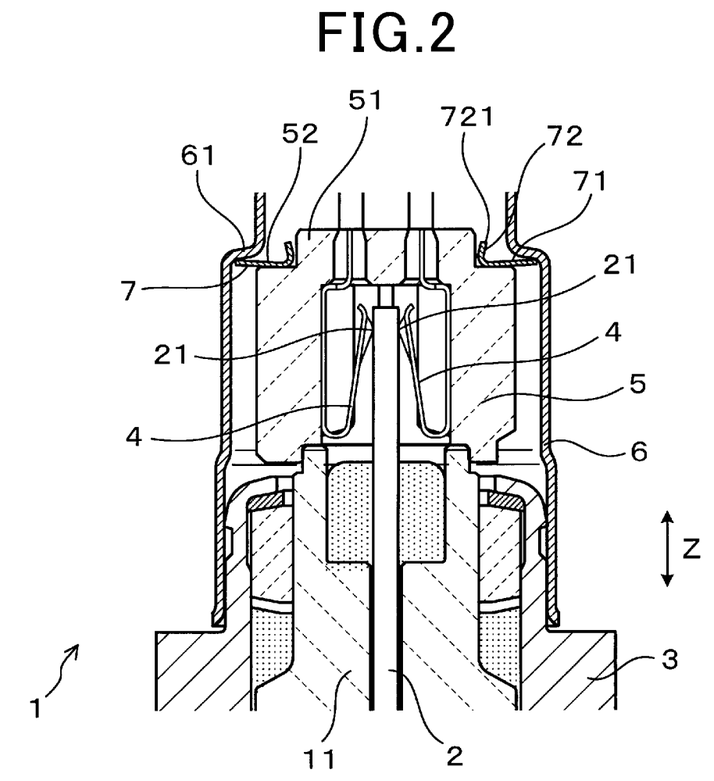
FIG. 2 is an enlarged sectional view in the vicinity of an insulator according to the first embodiment.

As illustrated in FIG. 2, the insulator 5 has a base end side projecting portion 51 projecting toward the base end side. The insulator 5 has an outer periphery base end face 52, which faces toward the base end side, around the base end side projecting portion 51.

Figure 3:
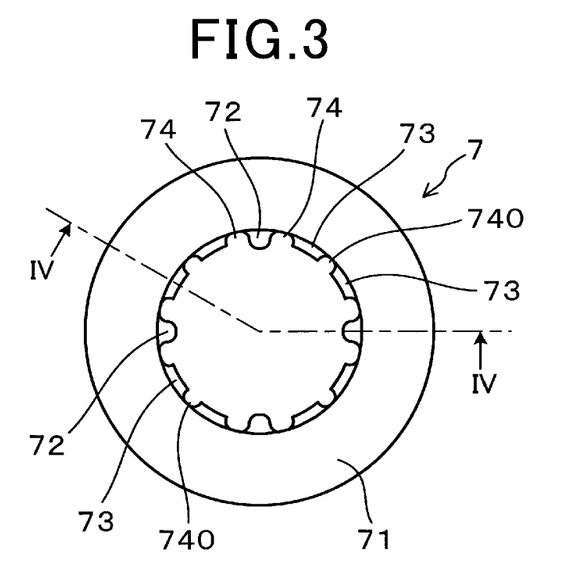
FIG. 3 is a plan view of a disc spring according to the first embodiment.
Figure 4:
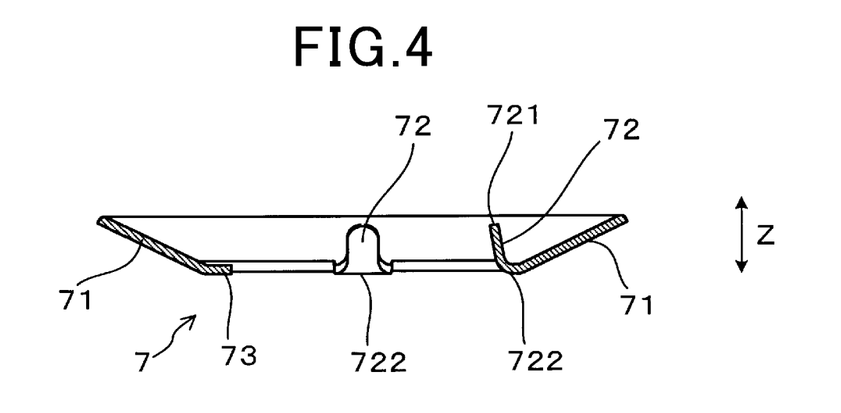
FIG. 4 is a cross-sectional view taken in the direction of arrows along line IV-IV of FIG. 3.
Figure 6:
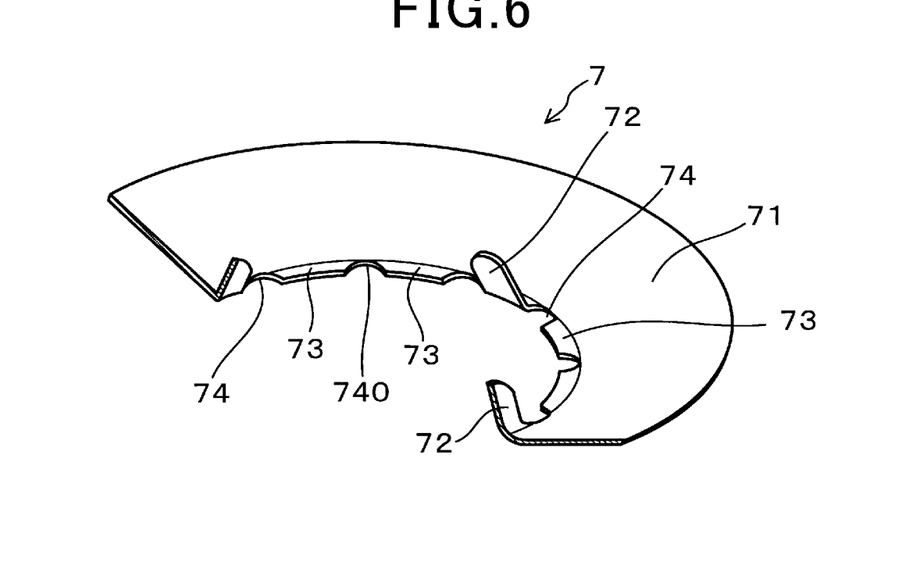
FIG. 6 is a partial cross-sectional perspective view of the disc spring according to the first embodiment.

As illustrated in FIG. 3, FIG. 4, and FIG. 6, the disc spring 7 has a circular body portion 71 and a plurality of claw portions 72. As illustrated in FIG. 2 and FIG. 4, the claw portion 72 projects from an inner peripheral edge of the circular body portion 71 toward the base end side.

As illustrated in FIG. 2, in a state in which the gas sensor 1 is assembled, a projecting end 721 of the claw portion 72 of the disc spring 7 is separated from the base end side projecting portion 51. The projecting end 721 of the claw portion 72 is located at the tip end side in the axial direction Z with respect to the base end of the base end side projecting portion 51 of the insulator 5.

The gas sensor 1 is provided to, for example, an exhaust pipe of an internal combustion engine of a vehicle and detects exhaust gas flowing in the exhaust pipe. The gas sensor 1 is mounted to the exhaust pipe by screwing a mounting screw portion of the housing 3 into a female screw provided to the exhaust pipe. In the axial direction Z, the side inserted into the exhaust pipe is referred to as the tip end side, and the side opposite to the tip end side is referred to as the base end side.

As illustrated in FIG. 1 and FIG. 2, the gas sensor 1 of the present embodiment has an element holder 11 holding the sensor element 2. The element holder 11 holds the sensor element 2 in a state in which the sensor element 2 is inserted thereinto and is held on the inner periphery side of the housing 3. The element holder 11 is formed of, for example, an insulating member such as ceramic. Material of the element holder 11 is not particularly limited but may be, for example, metal.

A tip end portion of the insulator 5 and a base end portion of the element holder 11 are brought into contact with each other in the axial direction Z. That is, the insulator 5 is held between the disc spring 7 and the element holder 11. Restoring force of the elastically deformed disc spring 7 presses the insulator 5 against the element holder 11 in the axial direction Z. Hence, in the base end side cover 6, the insulator 5 is stably disposed.

The base end side cover 6 is fixed to the base end portion of the housing 3 by welding or the like. The base end side cover 6 has a cylindrical shape so as to cover the insulator 5. The base end side cover 6 has a step portion 61 having an inner face facing toward the tip end side at a position in the axial direction in the vicinity of a base end portion of the insulator 5. An outer peripheral edge of the disc spring 7 is supported on the step portion 61. Part of the disc spring 7 in the vicinity of an inner peripheral edge thereof is brought into contact with the outer periphery base end face 52 of the insulator 5. Thus, the disc spring 7 intervenes between the base end side cover 6 and the insulator 5.

The insulator 5 is formed of, for example, ceramic such as alumina. The insulator 5 houses the plurality of contact terminals 4 thereinside and holds them. The contact terminals 4 are pressed into contact with the electrode terminals 21 of the sensor element 2. The electrode terminals 21 are electrically connected to a sensor cell (not shown) of the sensor element 2. If the sensor element 2 is integrated with a heater, some of the contact terminals 4 are pressed into contact with the electrode terminals 21 electrically connected to the heater. The base end portion of each of the contact terminals 4 is inserted into the insulator 5 and toward the base end side of the insulator 5, and is connected to a lead 12. As illustrated in FIG. 1, the lead 12 penetrates a rubber bush 13 provided to the base end portion of the base end side cover 6 and externally extends.

As illustrated in FIG. 1, a tip end side cover 16 is fixed to the tip end side of the housing 3. The tip end side cover 16 is formed so as to cover a tip end portion of the sensor element 2. The tip end side cover 16 is provided with air vents through which measure gas passes. In the present embodiment, the tip end side cover 16 has a double structure.

FIG. 3, FIG. 4, and FIG. 6 illustrate a shape of the disc spring 7 in a free state.

As illustrated in FIG. 3, the circular body portion 71 is a circular shape. As illustrated in FIG. 4, in the free state, the circular body portion 71 is inclined toward the base end as the circular body portion 71 approaches the outer periphery side. As illustrated in FIG. 3, FIG. 4, and FIG. 6, the plurality of claw portions 72 project from the inner peripheral edge of the circular body portion 71. Each of the claw portions 72 project from the inner peripheral edge of the circular body portion 71 to the inner periphery side and projects to the base end side while curving. In the free state, the claw portion 72 is inclined so as to approach the inner periphery side as the claw portion 72 approaches the base end side.

As illustrated in FIG. 3 and FIG. 6, the disc spring 7 has a flange portion 73 projecting from the inner peripheral edge of the circular body portion 71 to the inner periphery side. In the gas sensor 1, the flange portion 73 contacts the outer periphery base end face 52 of the insulator 5 (refer to FIG. 12). In the free state, the flange portion 73 has a planar shape substantially orthogonal to the axial direction Z.

Figure 5:
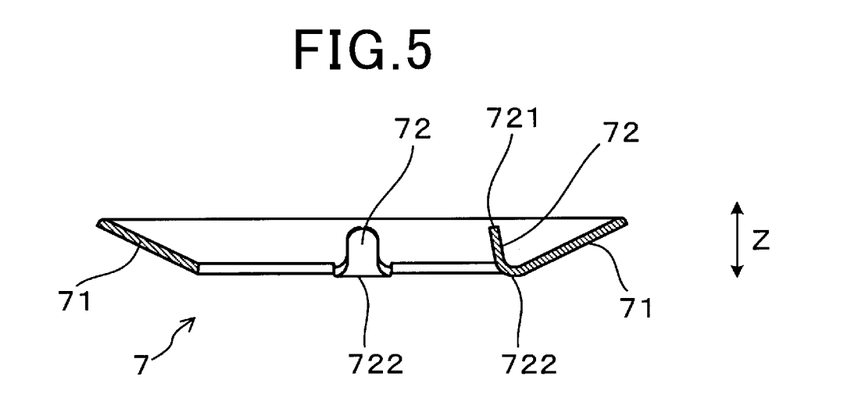
FIG. 5 is a view of a disc spring that is not provided with a flange portion, the view corresponding to the cross-sectional view taken in the direction of arrows along line IV-IV of FIG. 3.

As illustrated in FIG. 3 and FIG. 6, a slit 74 is formed between the claw portion 72 and the flange portion 73 in the circumferential direction of the disc spring 7. A plurality of flange portions 73 are formed side by side in the circumferential direction between the claw portions 72 adjacent to each other in the circumferential direction of the disc spring 7. In the present embodiment, two claw portions 72 are formed side by side in the circumferential direction between the two claw portions 72 adjacent to each other. A slit 740 is formed between the two flange portions 73. As illustrated in FIG. 4, at least part of a root portion 722 of the claw portion 72 and the flange portion 73 branched from the circular body portion 71 is disposed slightly on the tip end side in the axial direction Z (i.e., the lower side in FIG. 4)

with respect to the inner peripheral edge of the circular body portion 71. After the root portion 722 branching from the circular body portion 71 slightly projects toward the tip end side in the axial direction Z with respect to the circumference of the root portion 722, the claw portion 72 springs up toward the base end side in the axial direction Z. As illustrated in FIG. 5, if the flange portion 73 is not provided, only the root portion 722 of the claw portion 72 projects toward the tip end side in the axial direction Z and is brought into contact with outer periphery base end face 52 of the insulator 5. By providing the flange portion 73, the disc spring 7 is brought into contact with the insulator 5 at not only the root portion 722 of the claw portion 72 but also part of the flange portion 73. That is, a contact area between the disc spring 7 and the insulator 5 can be increased.

The disc spring 7 is made of a material that can ensure sufficient spring characteristics even under a high-temperature environment in an exhaust system of an internal combustion engine. As the material of the disc spring 7, for example, an alloy such as Inconel 718, InconelX750, Inconel600, SUS310, and SUS 304 can be used. Inconel is a registered trademark. The plate thickness of the disc spring 7 may be, for example, approximately 0.2 to 1.1 mm.

Next, an example of a method of assembling the gas sensor 1 of the present embodiment will be described.

Figure 7:
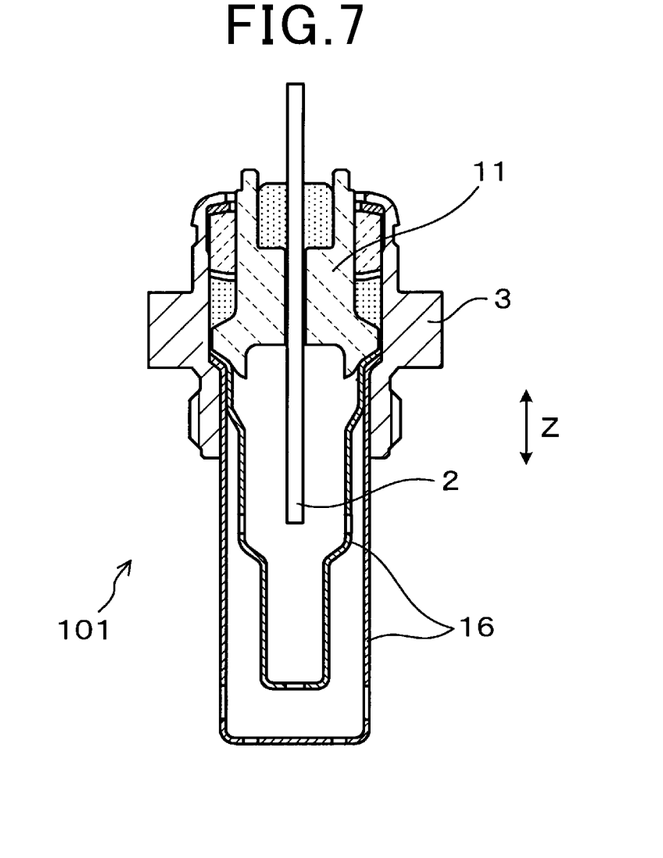
FIG. 7 is a cross-sectional view of a tip end side sub-assembly according to the first embodiment.
Figure 8:
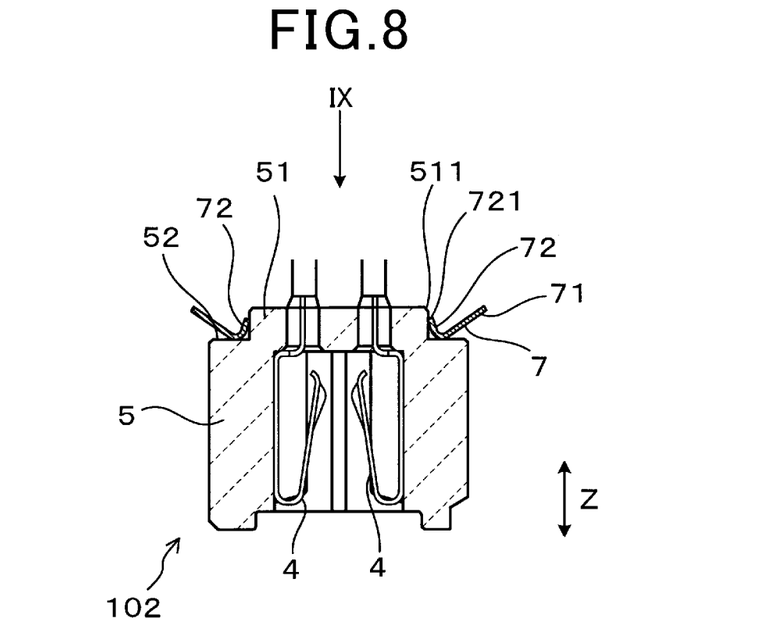
FIG. 8 is a cross-sectional view of a terminal part sub-assembly according to the first embodiment.

First, as illustrated in FIG. 7, a tip end side cover 16 and the element holder 11 that holds the sensor element 2 are fixed to the housing 3 to assemble a tip end side sub-assembly 101. As illustrated in FIG. 8, the contact terminals 4 are assembled into the insulator 5, and the disc spring 7 is mounted to the insulator 5, whereby a contact portion sub-assembly 102 is assembled.

Figure 9:
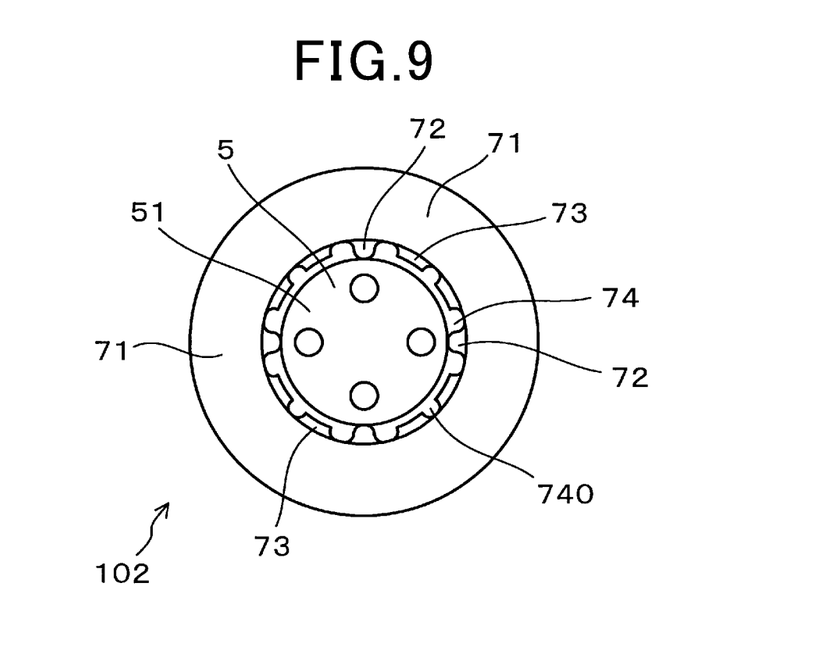
FIG. 9 is a view taken in the direction of an arrow along line IX of FIG. 8.

When the contact portion sub-assembly 102 is assembled, the disc spring 7 illustrated in FIG. 3, FIG. 4, and FIG. 6 are mounted to the outer periphery of the base end side projecting portion 51 of the insulator 5 as illustrated in FIG. 8 and FIG. 9. That is, the base end side projecting portion 51 is inserted inside the disc spring 7. At this time, the plurality of claw portions 72 of the disc spring 7 are pressed into contact with an outer periphery of the base end side projecting portion 51.

In this state, each of the claw portions 72 is slightly elastically deformed, and a diameter of an inscribed circle of a projecting end 721 of each of the claw portions 72 slightly expands from the free state. Conversely, the diameter of the inscribed circle of the projecting end 721 of each of the claw portions 72 of the disc spring 7 in the free state is slightly shorter than the diameter of the base end side projecting portion 51 of the insulator 5. Hence, as described above, the plurality of claw portions 72 are pressed into contact with the base end side projecting portion 51, whereby the disc spring 7 is mounted to the insulator 5.

In this stage, as illustrated in FIG. 8, the claw portion 72 is inclined so as to approach the inner periphery side as the claw portion 72 approaches the base end side. The projecting end 721 of the claw portion 72 is pressed into contact with a side surface of the base end side projecting portion 51 of the insulator 5. In the present embodiment, a corner portion of the base end of the base end side projecting portion 51 has a chamfered portion 511. Hence, the projecting end 721 of the claw portion 72 contacts the side surface of the base end side projecting portion 51 on the tip end side in the axial direction Z with respect to the chamfered portion 511.

The disc spring 7 is also brought into contact with the outer periphery base end face 52 of the insulator 5. The flange portion 73 also brings into contact with the outer periphery base end face 52 together with the root portion of the claw portion 72. In the stage of assembling the contact portion sub-assembly 102, the disc spring 7 may not be necessarily brought into contact with the outer periphery base end face 52. That is, thereafter, the disc spring 7 may be brought into contact with the outer periphery base end face 52 when the disc spring 7 is elastically compressed.

Figure 12:
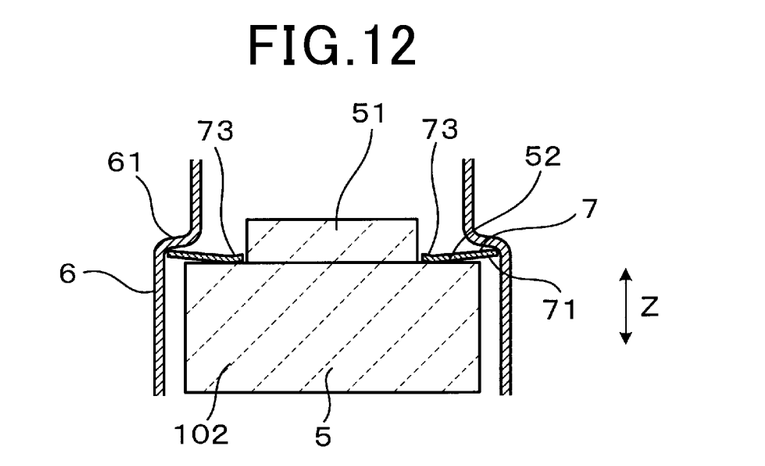
FIG. 12 is an explanatory diagram illustrating a method of assembling the gas sensor and another schematic cross-sectional view of a state in which the disc spring is elastically compressed according to the first embodiment.

As described above, the contact portion sub-assembly 102 illustrated in FIG. 8 and FIG. 9 is assembled. In this stage of the contact portion sub-assembly 102, the lead 12 may be contacted to the contact terminal 4. As illustrated in FIG. 9 and FIG. 12, the flange portion 73 does not contact the base end side projecting portion 51 either before or after elastic compression of the disc spring 7.

Figure 10:
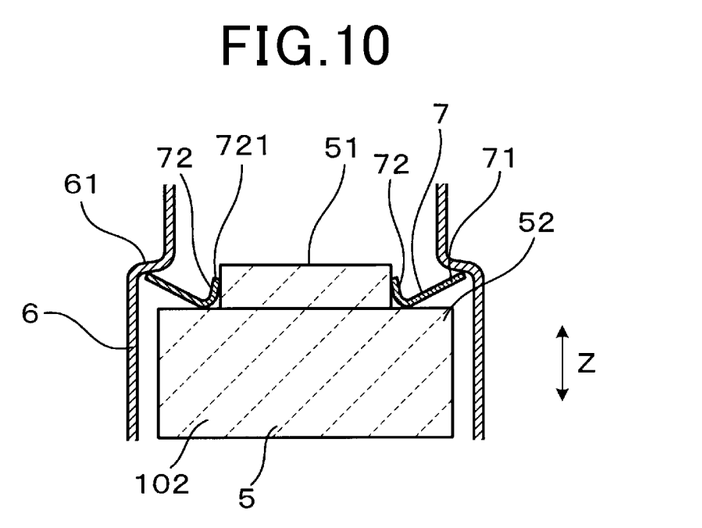
FIG. 10 is an explanatory diagram illustrating a method of assembling the gas sensor and a schematic cross-sectional view of a state immediately before the disc spring is elastically compressed according to the first embodiment.

Next, on the base end side of the tip end side sub-assembly 101, the contact portion sub-assembly 102 is disposed. At this time, the tip end of the insulator 5 is brought into contact with the base end of the element holder 11. As illustrated in FIG. 10 as a schematic view, the base end side cover 6 is provided from the base end side so as to cover the outer periphery of the contact portion sub-assembly 102.

At this time, the step portion 61 of the base end side cover 6 is brought into contact with the disc spring 7 on the contact portion sub-assembly 102 from the base end side in the axial direction Z. The step portion 61 is brought into contact with the outer peripheral edge of the circular body portion 71 of the disc spring 7. The step portion 61 is brought into contact with the whole circumference of the outer periphery edge of the circular body portion 71.

Figure 11:
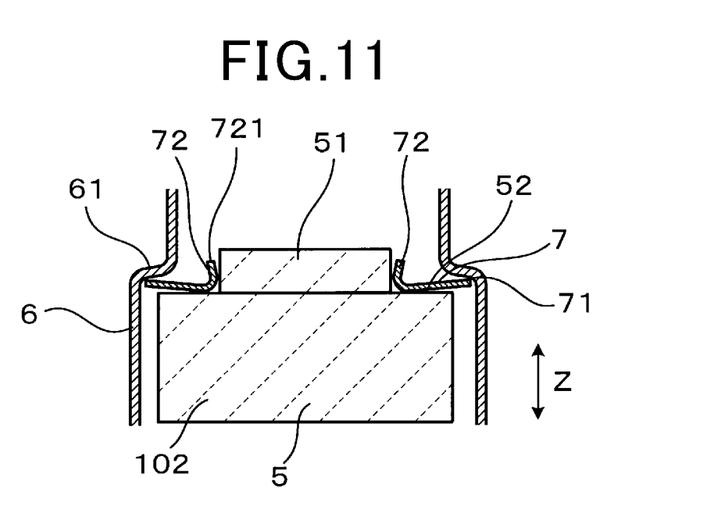
FIG. 11 is an explanatory diagram illustrating a method of assembling the gas sensor and a schematic cross-sectional view of a state in which the disc spring is elastically compressed according to the first embodiment.

In this state, the base end side cover 6 is pressed toward the tip end side in the axial direction Z. That is, the base end side cover 6 is pressed toward the tip end side sub-assembly 101. As a result, as illustrated in FIG. 11 and FIG. 12, the disc spring 7 held between the outer periphery base end face 52 of the insulator 5 and the step portion 61 of the base end side cover 6 is compressed in the axial direction Z, thereby being elastically deformed. That is, the circular body portion 71 is elastically compressed in the axial direction Z. At this time, a plurality of flange portions 73 are pressed into contact with the outer periphery base end face 52 together with the root portion of the claw portion 72 of the disc spring 7.

Figure 13:
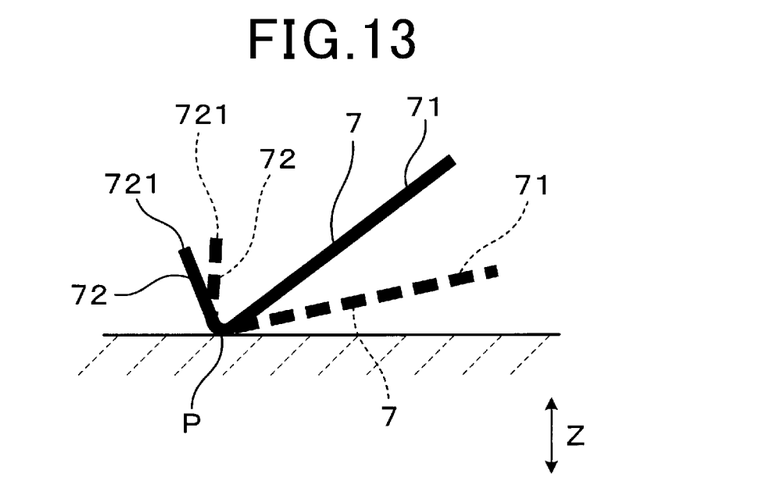
FIG. 13 is a schematic view of states before and after the disc spring is elastically compressed according to the first embodiment.

As illustrated in FIG. 13, when the circular body portion 71 is compressionally deformed in the axial direction Z, the angle of the claw portion 72 changes and so does the angle of the circular body portion 71. In FIG. 13, the shape indicated by a solid line represents a state before the elastic deformation, and the shape indicated by a broken line represents a state after the elastic deformation. When the elastic deformation is caused, the outer peripheral edge of the circular body portion 71 is deformed so as to approach the tip end side with a portion in the vicinity of the inner peripheral edge of the circular body portion 71, that is, in the vicinity of the root portion of the claw portion 72 serving as a fulcrum P. As a result, the projecting end 721 of the claw portion 72 moves toward the outer periphery side, or contact pressure of the claw portion 72 to the base end side projecting portion 51 decreases.

That is, in a state in which the claw portion 72 is pressed into contact with the base end side projecting portion 51, when the claw portion 72 is elastically deformed, the projecting end 721 of the claw portion 72 remains contacting the base end side projecting portion 51 until the deformation is restored. After the deformation is restored, according to the deformation of the circular body portion 71, the projecting end 721 of the claw portion 72 is displaced so as to approach the outer periphery side. As a result, as illustrated in FIG. 11, the projecting end 721 of the claw portion 72 is separated from the base end side projecting portion 51. Hence, the elastic deformation of the disc spring 7 is not hindered by the claw portion 72. As a result, restoring force depending on the elastic compression amount of the disc spring 7 affects the insulator 5, whereby the load can be adjusted easily as desired.

In a state in which the base end side cover 6 is pressed to a predetermined position, the base end side cover 6 is fixed to the housing 3 by welding or the like. Thus, the gas sensor 1 illustrated in FIG. 1 can be obtained.

Next, effects of the present embodiment will be described.

In the gas sensor 1, the disc spring 7 has the plurality of claw portions 72. Hence, in the stage before the gas sensor 1 is assembled, the plurality of claw portions 72 are pressed into contact with the side surface of the base end side projecting portion 51 of the insulator 5 to mount the disc spring 7 to the insulator 5.

Thereafter, in the assembly of the gas sensor 1, when the circular body portion 71 of the disc spring 7 is elastically compressed in the axial direction Z, deformation of the circular body portion 71 lowers pressure of the claw portion 72 against the base end side projecting portion 51. Hence, the elastic deformation of the circular body portion 71 is not hindered by the interference between the insulator 5 and the claw portion 72. Hence, the load to the insulator 5 can be easily adjusted by the disc spring 7.

As described above, since the disc spring 7 can be mounted to the insulator 5 before the gas sensor 1 is assembled, ease of assembling the gas sensor 1 can be improved. In addition, since the elastic deformation of the disc spring 7 is not hindered, the load to the insulator 5 can be easily adjusted by the disc spring 7.

The disc spring 7 has a flange portion 73, which contacts the outer periphery base end face 52. Hence, a contact area in which the disc spring 7 contacts the outer periphery base end face 52 of the insulator 5 can be increased. That is, since a contact portion of the disc spring 7 against the outer periphery base end face 52 can be provided to not only the root portion of the claw portion 72 but also the flange portion 73, the contact area can be increased easily. As a result, the insulator 5 can be prevented from being locally affected by a load.

A slit 74 is formed between the claw portion 72 and the flange portion 73 in the circumferential direction of the disc spring 7. Hence, the spring constant of the disc spring 7 can be suppressed from being too high due to the provision of the flange portion 73.

The plurality of flange portions 73 are formed side by side in the circumferential direction between the two claw portions 72 adjacent to each other in the circumferential direction of the disc spring 7. Hence, the spring constant of the disc spring 7 can be suppressed from being too high due to the provision of the flange portion 73, while a contact area between the outer periphery base end face 52 of the insulator 5 and the disc spring 7 can be increased easily.

The projecting end 721 of the claw portion 72 is separated from the base end side projecting portion 51. Hence, the elastic deformation of the disc spring 7 can be prevented from being hindered more reliably by the interference between the claw portion 72 and the base end side projecting portion 51 of the insulator 5.

As described above, according to the present embodiment, a gas sensor can be provided by which ease of adjusting a load to an insulator and ease of assembling the gas sensor can be compatible with each other.

In the above embodiment, although the insulator 5 is brought into contact with the element holder 11, the insulator 5 may be brought into contact with another member such as the housing 3. In the above embodiment, although the element holder 11 holding the sensor element 2 is fixed to the housing 3, the housing may directly hold the sensor element. In the above embodiment, although the number of the claw portions 72 of the disc spring 7 is four, the number of the claw portions is not limited if the number is plural. From the viewpoint of stability, the number of the claw portions is preferably three or more.

The present disclosure is not limited to the above-described embodiments, and is applicable to various embodiments without departing from the gist thereof.

The present disclosure has so far been described based on some embodiments. However, the present disclosure should not be construed as being limited to these embodiments or the structures. The present disclosure should encompass various modifications, or modifications within the range of equivalence. In addition, various combinations and modes, as well as other combinations and modes, including those which include one or more additional elements, or those which include fewer elements should be construed as being within the scope and spirit of the present disclosure.

An aspect of the present disclosure provides a gas sensor (1), including: a sensor element (2) that detects a concentration of a specified gas in measured gas; a housing (3) on an inner periphery side of which the sensor element is disposed; a contact terminal (4) that contacts an electrode terminal (21) provided to the sensor element; an insulator (5) that holds the contact terminal; a base end side cover (6) that is fixed to a base end side of the housing and covers the insulator; and a disc spring (7) that is disposed between the base end side cover and the insulator and pushes the insulator toward a tip end side. The insulator has a base end side projecting portion (51) projecting toward the base end side and has an outer periphery base end face (52), which faces toward the base end side, around the base end side projecting portion. The disc spring has a circular body portion (71) and a plurality of claw portions (72) that project from an inner peripheral edge of the circular body portion toward the base end side. The disc spring has a flange portion (73) that projects from the inner peripheral edge of the circular body portion to the inner periphery side, and the flange portion contacts the outer periphery base end face.

In the gas sensor, the disc spring has the plurality of claw portions. Hence, in the stage before the gas sensor is assembled, the plurality of claw portions are pressed into contact with the side surface of the base end side projecting portion of the insulator to mount the disc spring to the insulator.

Thereafter, in the assembly of the gas sensor, when the circular body portion of the disc spring is elastically compressed in the axial direction, deformation of the circular body portion lowers pressure of the claw portion against the base end side projecting portion. Hence, elastic deformation of the circular body portion is not hindered by interference between the insulator and the claw portion. Hence, the load to the insulator can be easily adjusted by the disc spring.

As described above, since the disc spring can be mounted to the insulator before the gas sensor is assembled, ease of assembling the gas sensor can be improved. In addition, since the elastic deformation of the disc spring is not hindered, the load to the insulator can be easily adjusted by the disc spring.

As described above, according to the above embodiment, a gas sensor can be provided by which ease of adjusting a load to an insulator and ease of assembling the gas sensor can be compatible with each other.

What is claimed is:

1. A gas sensor, comprising:
   a sensor element that detects a concentration of a specified gas in measured gas;
   a housing on an inner periphery side of which the sensor element is disposed;
   a contact terminal that contacts an electrode terminal provided to the sensor element;
   an insulator that holds the contact terminal;
   a base end side cover that is fixed to a base end side of the housing and covers the insulator; and
   a disc spring that is disposed between the base end side cover and the insulator and pushes the insulator toward a tip end side, wherein
   the insulator has a base end side projecting portion projecting toward the base end side and has an outer periphery base end face, which faces toward the base end side around the base end side projecting portion,
   the disc spring has a circular body portion and a plurality of claw portions that project from an inner peripheral edge of the circular body portion toward the base end side, and
   the disc spring has a flange portion that projects from the inner peripheral edge of the circular body portion to the inner periphery side, and the flange portion contacts the outer periphery base end face.

2. The gas sensor according to claim 1, wherein a slit is formed between the claw portion and the flange portion in a circumferential direction of the disc spring.

3. The gas sensor according to claim 2, wherein a plurality of flange portions are formed side by side in the circumferential direction between the two claw portions adjacent to each other in the circumferential direction of the disc spring.

4. The gas sensor according to claim 1, wherein a projecting end of the claw portion is separated from the base end side projecting portion.

5. A gas sensor, comprising:
   a sensor element that detects a concentration of a specified gas in measured gas;
   a housing on an inner periphery side of which the sensor element is disposed;
   a contact terminal that contacts an electrode terminal provided to the sensor element;
   an insulator that holds the contact terminal;
   a base end side cover that is fixed to a base end side of the housing and covers the insulator; and
   a disc spring that is disposed between the base end side cover and the insulator and pushes the insulator toward a tip end side, wherein
   the insulator has a base end side projecting portion projecting toward the base end side and has an outer periphery base end face, which faces toward the base end side around the base end side projecting portion,
   the disc spring has a circular body portion and a plurality of claw portions that project from an inner peripheral edge of the circular body portion toward the base end side, and
   a projecting end of the claw portion is separated from the base end side projecting portion.

* * * * *